UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN SOLUTIONS FOR CHEMICAL TELEGRAPH-PAPER.

Specification forming part of Letters Patent No. 160,402, dated March 2, 1875; application filed June 1, 1874.

CASE No. 78.

*To all whom it may concern:*

Be it known that I, THOMAS A. EDISON, of Newark, in the county of Essex and State of New Jersey, have invented an Improvement in Chemical Telegraphic Paper, of which the following is a specification:

Ferrocyanide, or yellow prussiate of potash, has been employed in the solution for the chemical paper used in telegraphing. This solution is not as sensitive as my improved solution.

I make use of ferridcyanide of potassium, or red prussiate of potash in solution. This material may be prepared by using about one part of ferrocyanide of potash to sixteen parts of water, through which solution chlorine gas is passed until it assumes a greenish red tinge.

The paper for the telegraphic receiving-instrument is to be immersed in this solution of ferridcyanide of potassium, and I prefer that chloride of calcium be added to the solution. An iron pen or stylus is used in the receiving-instrument.

I claim as my invention—

The solution for chemical telegraph-paper prepared with ferridcyanide of potassium, substantially as set forth.

Signed by me this 29th day of September, A. D. 1873.

THOMAS A. EDISON.

Witnesses:
GEO. T. PINCKNEY,
CHAS. H. SMITH.